United States Patent [19]
Chen

[11] Patent Number: 5,514,443
[45] Date of Patent: May 7, 1996

[54] CHOPPING BOARD PAD

[76] Inventor: Chung-jung Chen, No. 55, Nei Dong Rd., Hou Li Hsiang Taichung Hsien, Taiwan

[21] Appl. No.: 351,521

[22] Filed: Dec. 7, 1994

[51] Int. Cl.⁶ .................................. B32B 3/02; B32B 3/28
[52] U.S. Cl. ............................ 428/99; 428/119; 428/120; 428/131; 428/182; 428/183; 269/13; 269/15; 269/289 R; 269/309
[58] Field of Search ............................ 428/99, 119, 120, 428/131, 182, 183; 269/13, 15, 289 R, 309

Primary Examiner—Alexander S. Thomas
Attorney, Agent, or Firm—Bacon & Thomas

[57] ABSTRACT

A chopping board is supported on a pad formed from a plastic material which prevents the chopping board from slipping or vibrating when used for chopping different food products. The pad includes a peripheral wall, abutments spaced from and extending circumferentially around an inner surface of the wall, and a corner through hole. The upper surface of the pad is provided with a plurality of spaced convex areas, with each area having an upwardly extending projection. The lower surface of the pad is provided with a plurality of corresponding spaced concave areas, with a plurality of downwardly extending projections disposed between the concave areas. The chopping board may be provided with a corner hole corresponding to the hole of the pad to permit the board and pad to be hung together on a hanger for storage.

13 Claims, 11 Drawing Sheets

CHOPPING BOARD PAD

BACKGROUND OF THE INVENTION

The present invention relates to a pad for supporting a chopping board. Because of the special design and structure of the pad, when it is used for chopping vegetables, fruit or meat, it prevents the chopping board from sliding on a table, kitchen sink or counter surface, and may collect food juices from the chopping board and absorb vibration during chopping.

Referring to the course of the development of chopping boards, an early chopping board is made from wood sawn into a plate for use. However, it is heavy and produces wooden chips when used for chopping. Recently, due to a rising awareness of the environment, such wooden chopping boards are increasingly replaced by cheap, lightweight, beautiful and convenient plastic chopping boards.

Nevertheless, because of its light weight and smooth material, a plastic board slides on the kitchen sink or skips due to the chopping force when used for cutting vegetable or chopping meat, whereby the user is likely to become injured or food on the chopping board may fall to the floor.

Either a wooden chopping board or a plastic chopping board has a common defect, that is the juice arising from chopping a vegetable will flow to the surface of the chopping board. Because the chopping board has insufficient space for storing such juice, the juice flows to the kitchen sink along the edge of the chopping board. Moreover, the user may easily become injured due to the chopping board sliding on the kitchen sink as a result of the juice flowing into the contact portion between the chopping board and sink.

The inventor has developed this invention in order to solve the aforesaid defects found in the use of a conventional chopping board.

SUMMARY OF THE INVENTION

The pad for a chopping board is integrally injection molded from soft ethylene plastic material, having a wide body, and on same corresponding positions of upper and lower surfaces, a plurality of respective convex areas and a plurality of concave areas. The circumference of the body includes a wall around the body, and on an upper surface of the body around the inner surface of the wall are provided a plurality of sector elements projecting along the wall. The body is cut with a through hole, and a projection ring is formed along the inner perimeter of the through hole, with the outer wall of the projection ring having a plurality of spaced longitudinal strips. Each convex area is provided with an upwardly extending projection and downwardly extending projections are provided between adjacent concave areas. This pad may support a chopping board and prevent it from moving when used for chopping, and it may accept and store the juice of vegetables being cut on the chopping board.

DETAILED DESCRIPTION OF THE PREFERRED EMBODIMENTS

Figure 1:
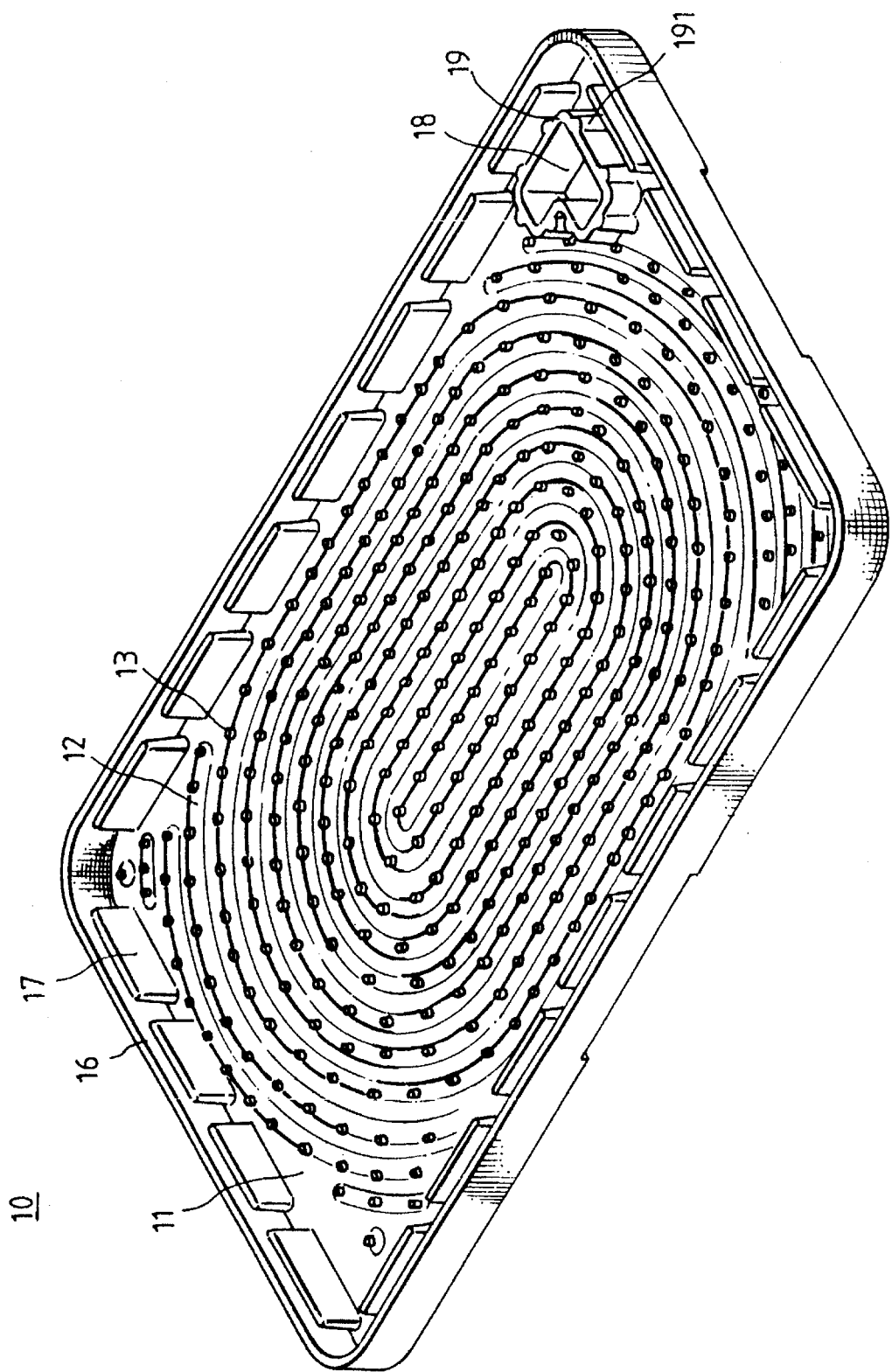
FIG. 1 is a perspective view showing the top of the first embodiment of the invention.
Figure 2:
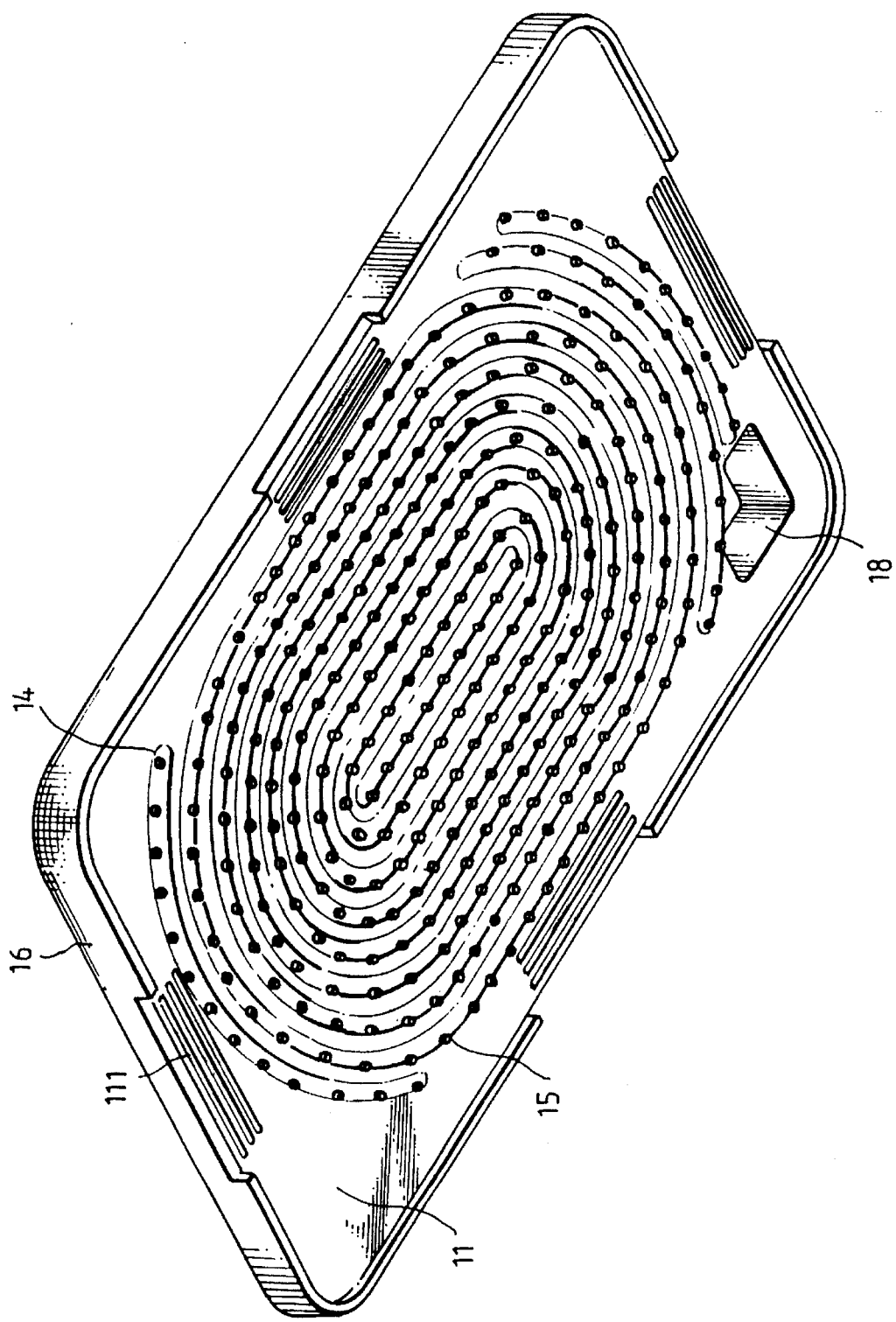
FIG. 2 is a perspective view showing the bottom of the first embodiment.
Figure 3:
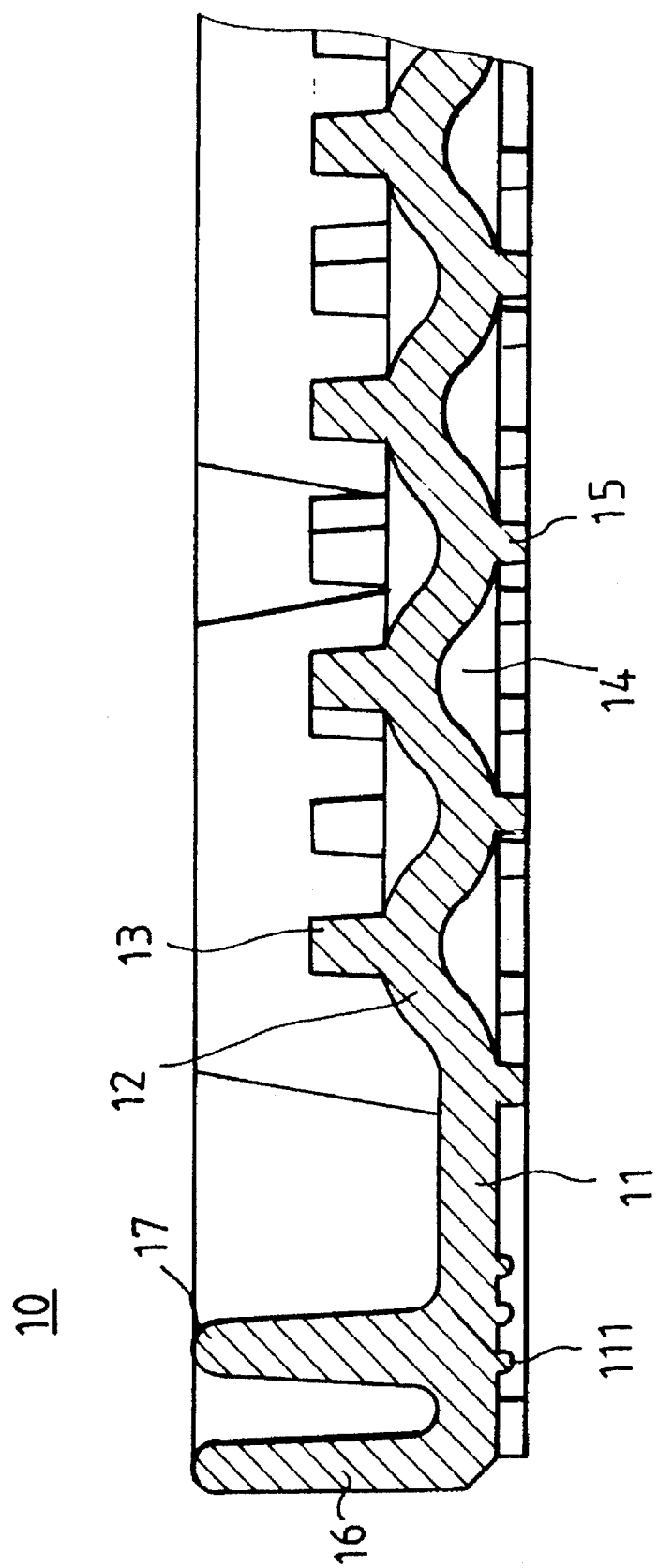
FIG. 3 is a partial cross-sectional view of the first embodiment.

Referring to FIGS. 1 thru 3, the present multi-purpose pad 10 for a chopping board is integrally formed from injection molded soft ethylene plastic material, having a wide rectangular body 11, and on the upper surface of said body 11 a plurality of arcuate-shaped convex areas 12 arranged at intervals from the center of said body 11, and on a top side of each area 12 there are a plurality of projections 13 arranged at intervals. The bottom surface of body 11 is provided with a plurality of arcuate-shaped concave areas 14 corresponding in location to convex areas 12. A plurality of downwardly extending projections 15 are spaced along areas between concave areas 14. Thus, areas 12 and 14 collectively define a corrugated structure. The circumference of the body 11 is surrounded by an upstanding wall 16. The upper surface of the body 11 near the inner side of wall 16 has a set of spaced sector plates 17 arranged at intervals along the wall 16. A corner of the body 11 is cut with an L-shaped hole 18 extending through the top and bottom surfaces of the body 11. A ring 19 is formed along the inner perimeter of through hole 18, with the outer wall of ring 19 having a plurality of longitudinal strips 191 spaced therearound.

Figure 4:
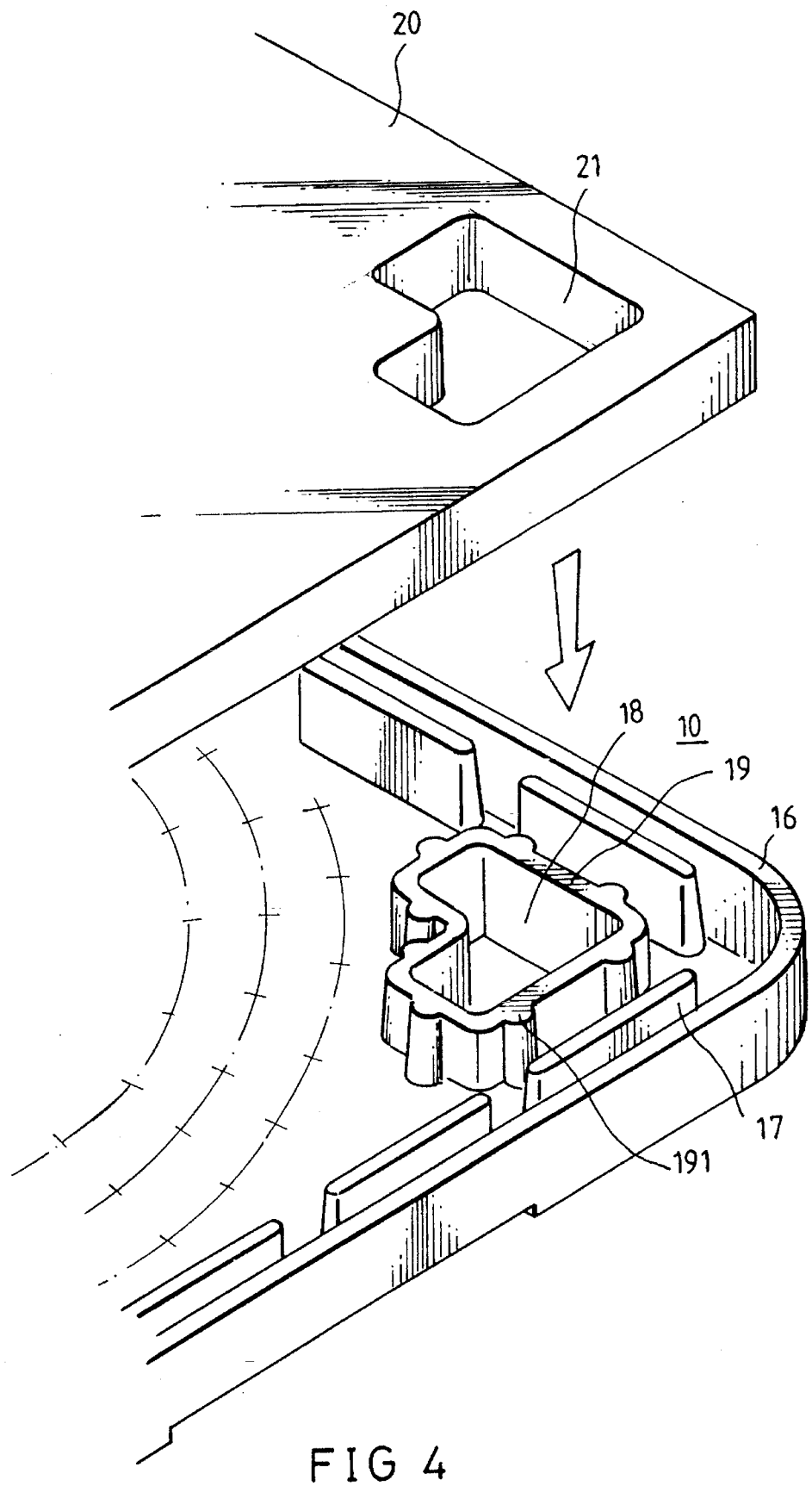
FIG. 4 is a partial exploded view showing the use of the first embodiment matched with a chopping board.

Referring to FIG. 4, said chopping board pad 10 may support a common plastic chopping board 20 as a surface for cutting and chopping vegetables and meat. In general, the plastic chopping board 20 has a hanging hole 21 for carrying/hanging, and is located on a corner of said chopping board 20. Hole 21 is L-shaped so that through hole 18 and ring 19 of chopping board pad 10 may be aligned. For supporting the chopping board 20, the pad shall first be placed horizontally on a kitchen sink or table, then hanging hole 21 of chopping board 20 shall be aligned with ring 19 of chopping board pad 10. The inner wall of hanging hole 21 will be engaged by the outer wall of ring 19 when hanging hole 21 is set on ring 19. Both side walls on hanging hole 21 of chopping board 20 will contact sector plates 17 near ring 19 on chopping board pad 10 so that chopping board 20 will be properly positioned on pad 10.

Figure 5:
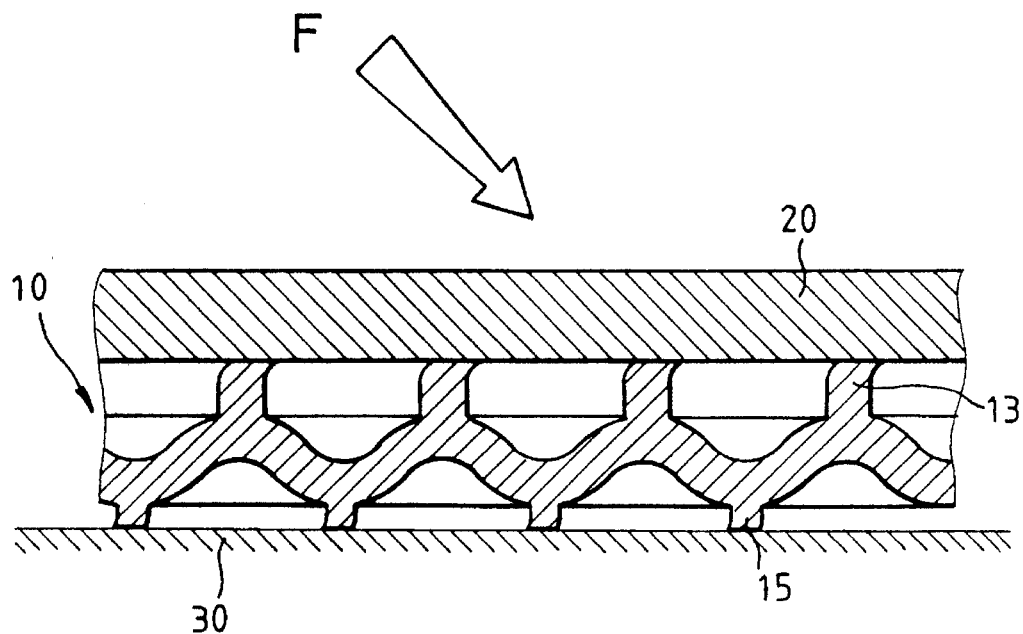
FIG. 5 is a diagrammatic view showing the deformation of a portion of the first embodiment when it supports a chopping board and receives an inclined force from the board.

Referring to FIG. 5, as said chopping board 20 is positioned on chopping board pad 10, an inclined force (F1) will be applied to chopping board 20 when it is used for cutting vegetables or fruit, and such inclined force (F1) will be transferred from chopping board 20 to the pad 10. Because the pad 10 is made from soft ethylene plastic, it may contact with the counter 30 by means of its downward projections 15 so that a friction force may occur between projections 15 and counter 30 when the inclined force (F1) is transferred from chopping board 20 to pad 10. Projections 15 deform as shown in FIG. 5 to prevent sliding movement between said pad 10 and the counter 30.

Figure 6:
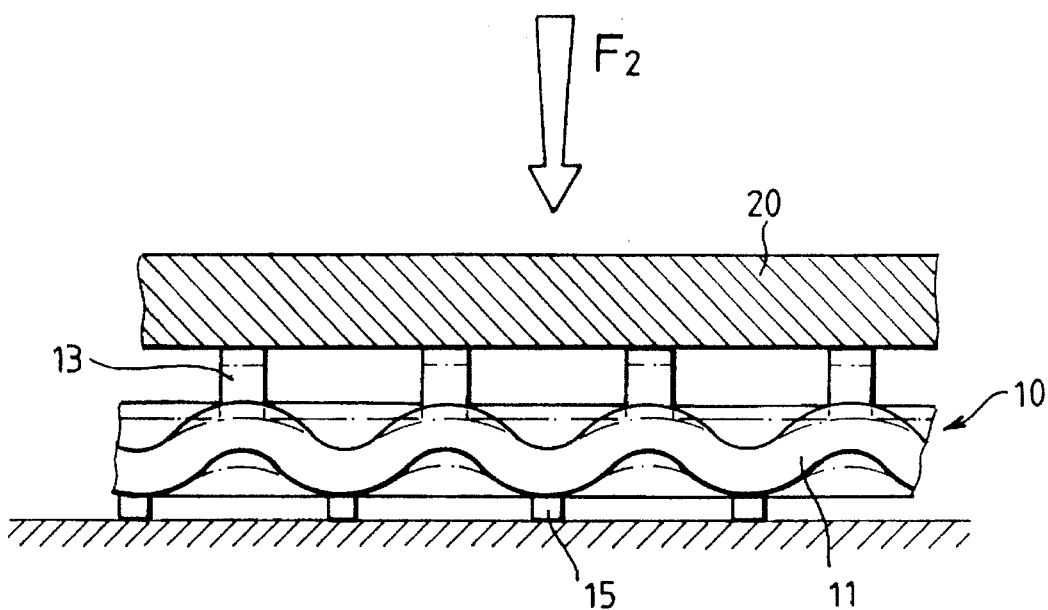
FIG. 6 is a diagrammatic view showing the deformation of a portion of the first embodiment when it supports a chopping board and receives a sudden perpendicular force from the board.

Referring to FIG. 6, as said chopping board 20 is positioned on chopping board pad 10, a sudden perpendicular force (F2) will be applied to chopping board 20 when it is used for chopping meat, and such perpendicular force (F2) will be transferred from chopping board 20 to the pad 10. As the force (F2) is applied to body 11 of pad 10 through projections 13 and 15, body 11 is deformed in the region of the convex areas 12, as indicated by the dotted lines in FIG. 6, and therefore absorbs the force (F2) to prevent shock-loading, vibration or skipping.

Figure 7:
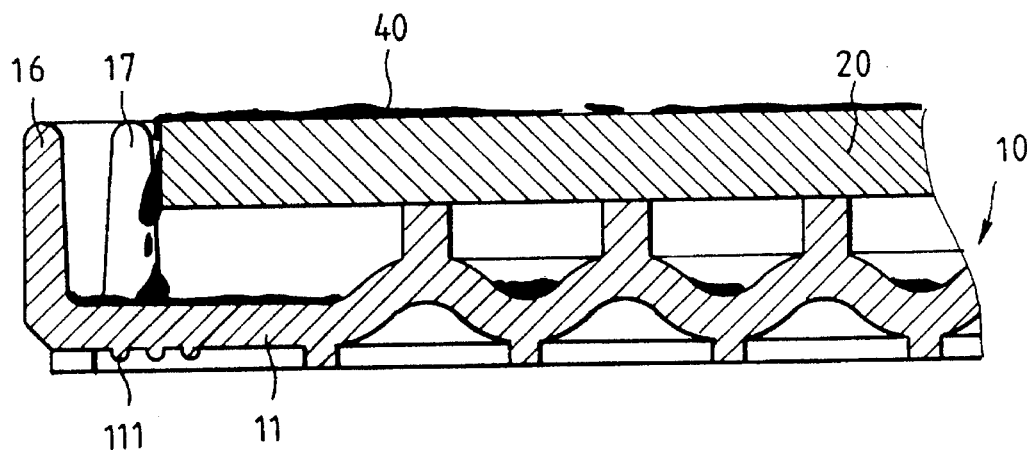
FIG. 7 is a diagrammatic view showing the flow and collection of residual vegetable juice when the first embodiment supports a chopping board.

Referring to FIG. 7, as said chopping board 20 is positioned on chopping board pad 10, vegetable juice 40 will spread all over chopping board 20 when used for cutting vegetable or fruit. While excessive fruit juice 40 may flow into the space between the bottom of chopping board 20 and upper surface of pad 10 along the edge of chopping board 20, the user may dispose such juice 40 from the pad by picking up the pad after cutting is finished in order to prevent juice 40 from overflowing to the counter from chopping board 20. Pad 10 is located on the body 11 near wall 16 and the function of sector plates 17 is to define a proper spacing between the edge of chopping board 20 and wall 16 of the pad 10 to prevent juice on chopping board 20 from flowing over wall 16. The longitudinal strips 191 on the outer wall of ring 19 are used for making a firm frictional engagement between the inner wall of hanging hole 21 of chopping board 20 and outer wall of ring 19.

Figure 8:
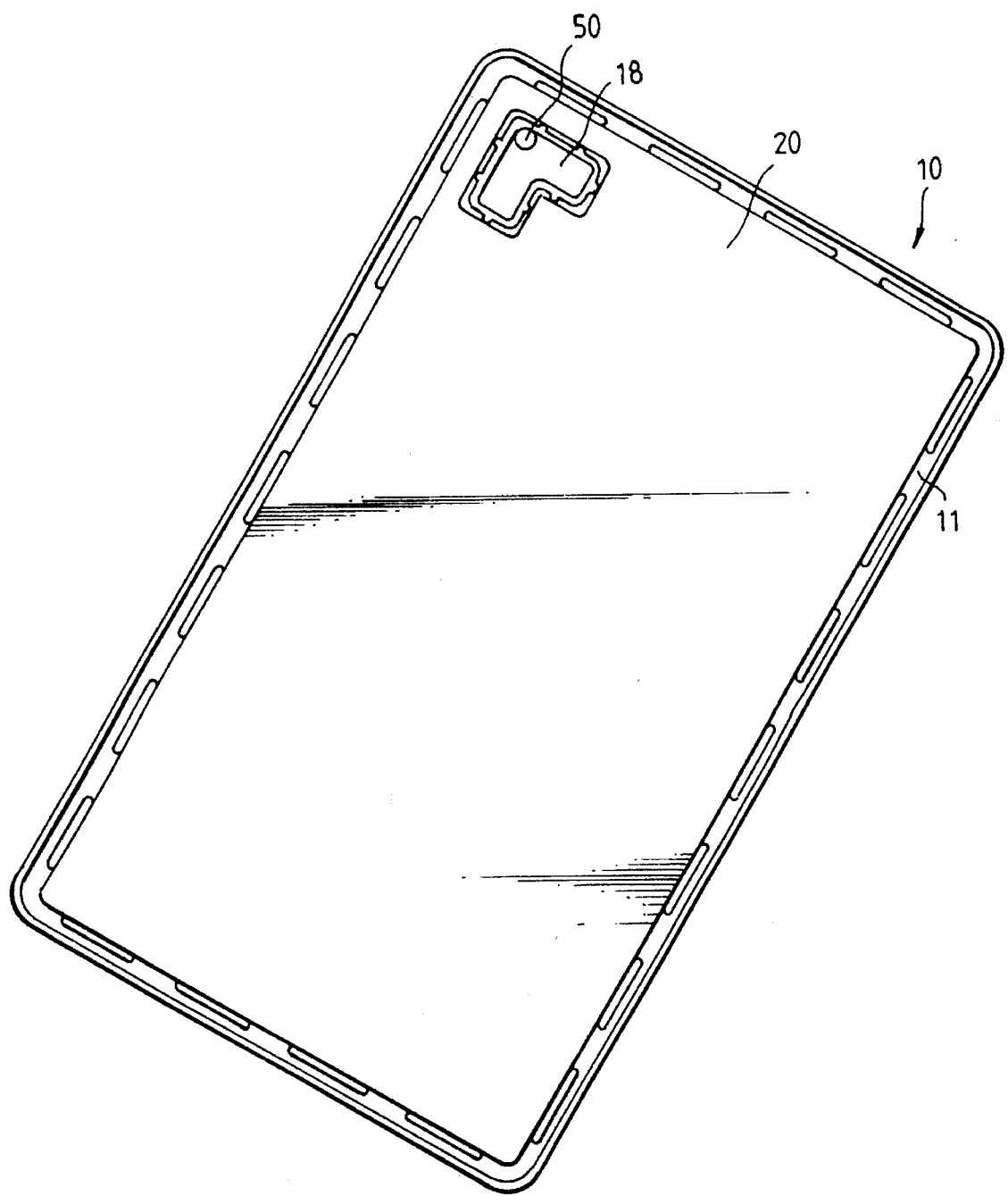
FIG. 8 is a flat diagrammatic view showing a combined hanging of the first embodiment with a chopping board.

Referring to FIG. 8, said chopping board 20 may be stored within the pad 10 and then hung together on the wall hanger 50 using through hole 18 on the body 11 of the pad 10 when not in use in order to save space.

Accordingly, the chopping board pad 10 has the following advantages:

A. To prevent chopping board 20 from sliding on a work surface when in use.

B. To prevent chopping board 20 from vibrating or skipping when in use and to avoid food falling from the board 20.

C. Pad 10 may provide for storage of juice 40 flowing from chopping board 20 so that frequent disposal of juice 40 is not required.

D. The pad 10 may be hung together with chopping board 20 in order to save space.

Figure 9:
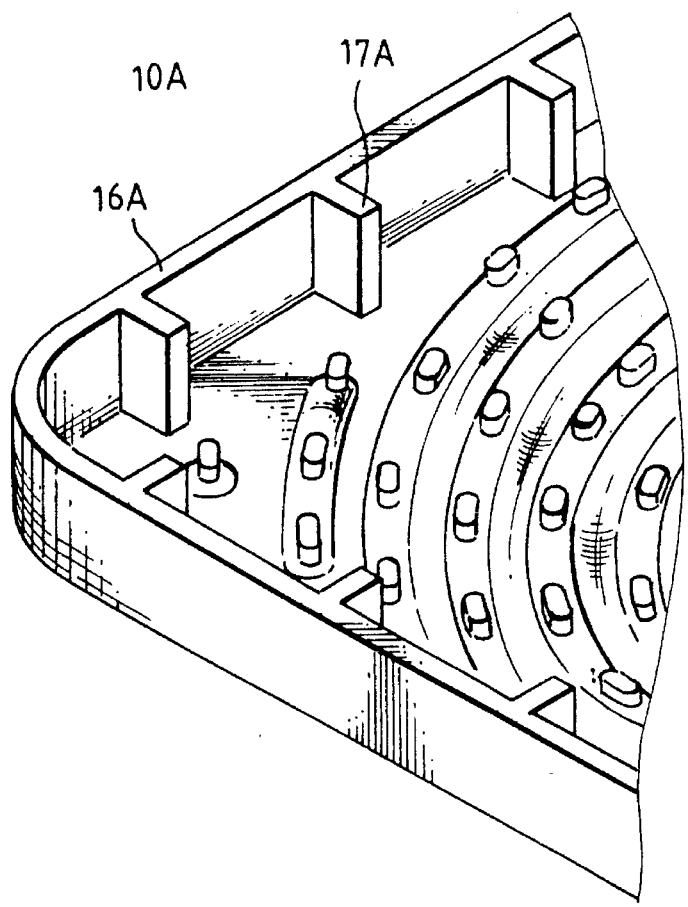
FIG. 9 is a partial perspective view showing a structure of a second embodiment of the invention.

Referring to FIG. 9, spaced fins 17A are provided along the inner side of wall 16A and vertical thereto. Fins 17A are designed as a substitute for sector plates 17 of the first embodiment, and in the same manner it serves the same function of defining a proper interval between the edge of chopping board 20 and wall 16A.

Figure 10:
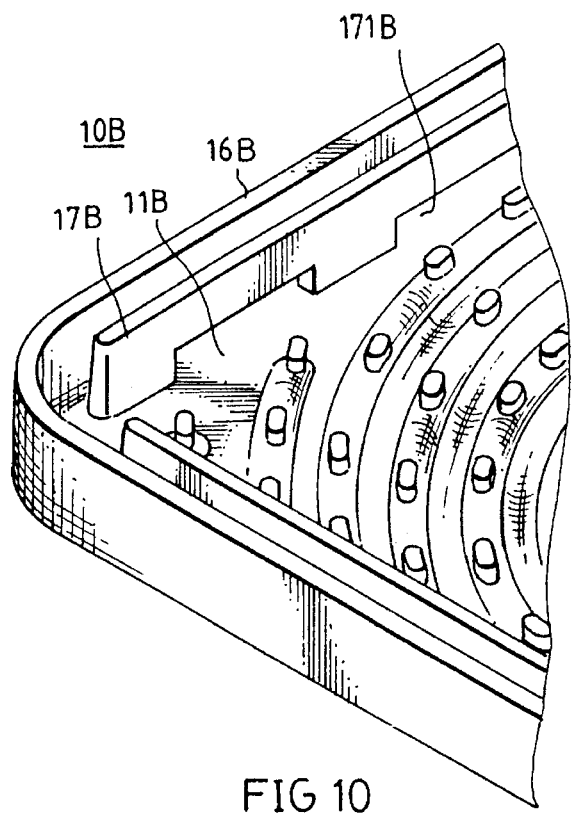
FIG. 10 is a partial perspective view showing a structure of a third embodiment of the invention.

Referring to FIG. 10, a sector wall 17B is provided on the upper surface of body 11 near wall 16B. Sector wall 17B is parallel to wall 16B, and along the bottom of said sector wall 17B are provided a plurality of spaced hollow areas 171. The effect is the same as sector plates 17 and fin 17A according to the first and second embodiments.

Figure 11:
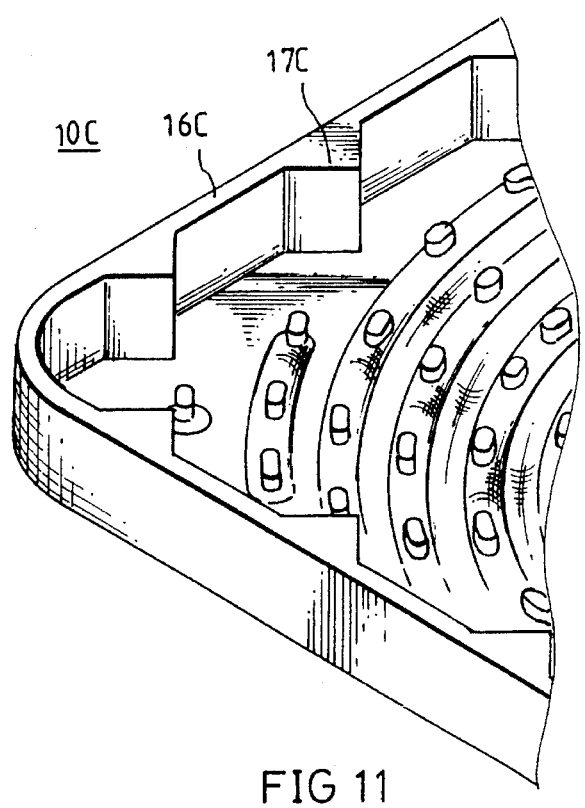
FIG. 11 is a partial perspective view showing a structure of a fourth embodiment of the invention.

Referring to FIG. 11, along an inner surface of wall 16C are provided some convex blocks 17C with end points which have the same function as sector plate 17, fin 17A and sector wall 17B, while also having the function of decorating the appearance of pad 10C.

Figure 12:
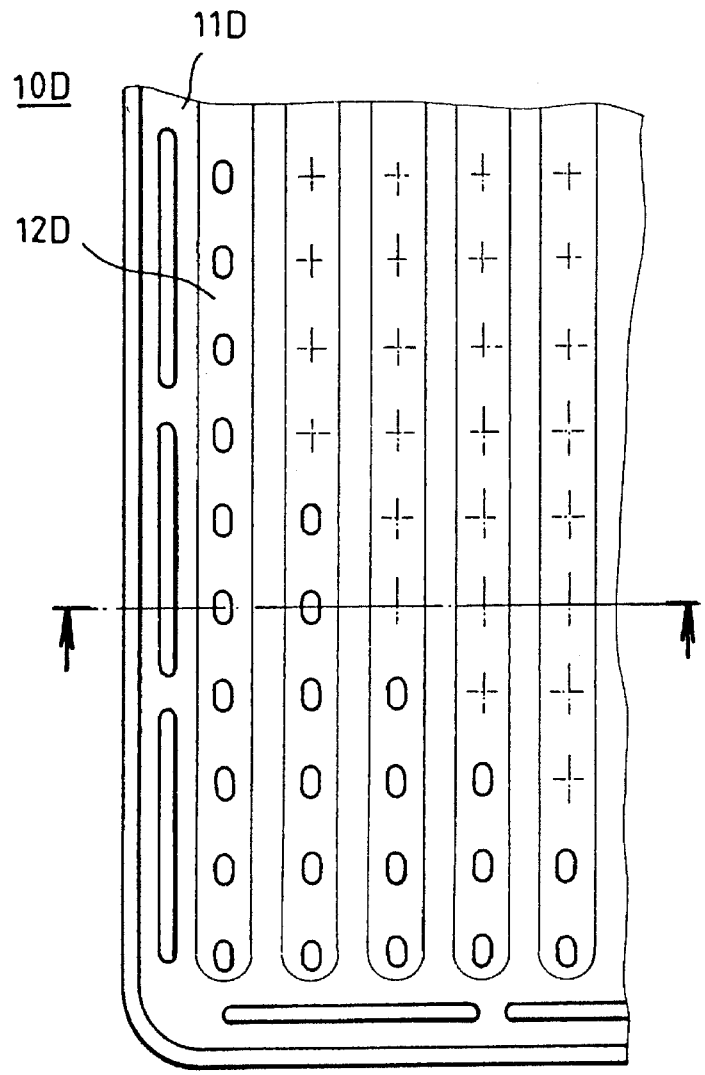
FIG. 12 is a partial plan view showing a structure of a fifth embodiment of the invention.
Figure 13:
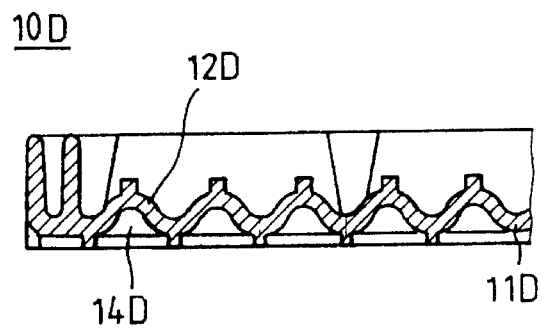
FIG. 13 is a partial sectional view showing a structure of the fifth embodiment of the invention.

Referring to FIGS. 12 and 13, the upper surface of the body 11 D is provided with straight convex areas 12D at intervals while the lower surface of the body 11D is provided with straight concave areas 14D, the latter corresponding to the shape and position of areas 12D. This configuration enables pad 10D to absorb perpendicular forces transferred from a chopping board and having the function of decorating the appearance of said pad 10.

Figure 14:
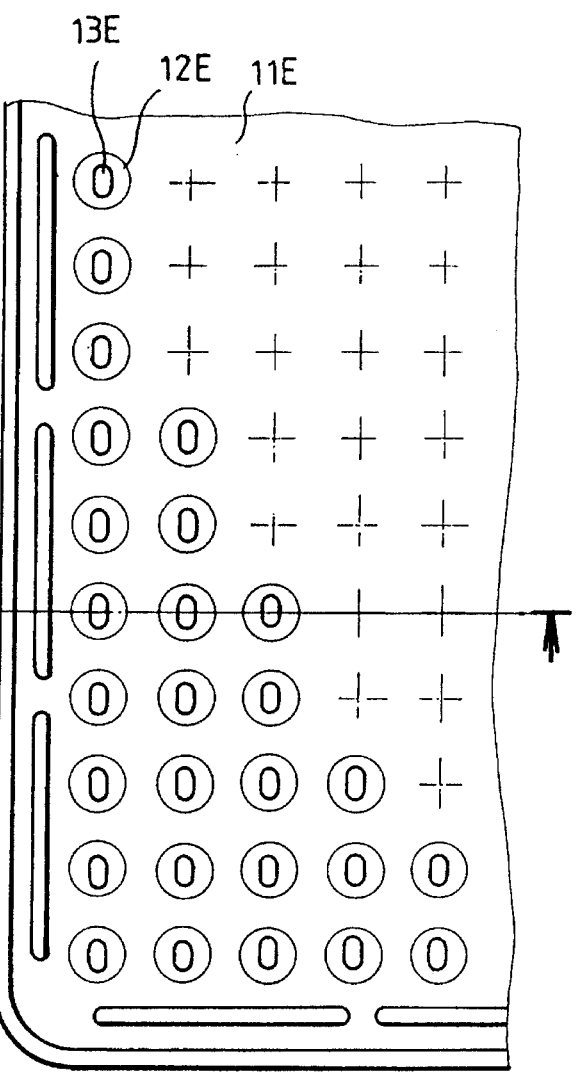
FIG. 14 is a partial plan view showing a structure of a sixth embodiment of the invention.
Figure 15:
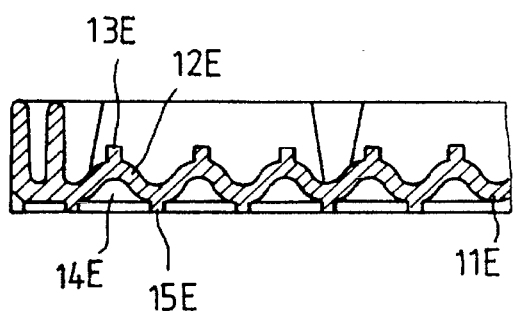
FIG. 15 is a partial sectional view showing a structure of the sixth embodiment.

Referring to FIGS. 14 and 15, an upper surface of said body 11 E has a plurality of convex areas in the form of spaced semi-spherical protuberances 12E. The top end of each protuberance 12E has an upwardly extending projection 13E. The lower surface of the body 11E, corresponding to the positions of the protuberances 12E on the upper surface, is provided with a plurality of concave areas 14E, with sections between areas 14E being each provided with a downwardly extending projection 15E. Protuberances 12E and areas 14E enable pad 10D to absorb perpendicular forces transferred to the chopping board and also provide a decorative effect to pad 10.

Figure 16:
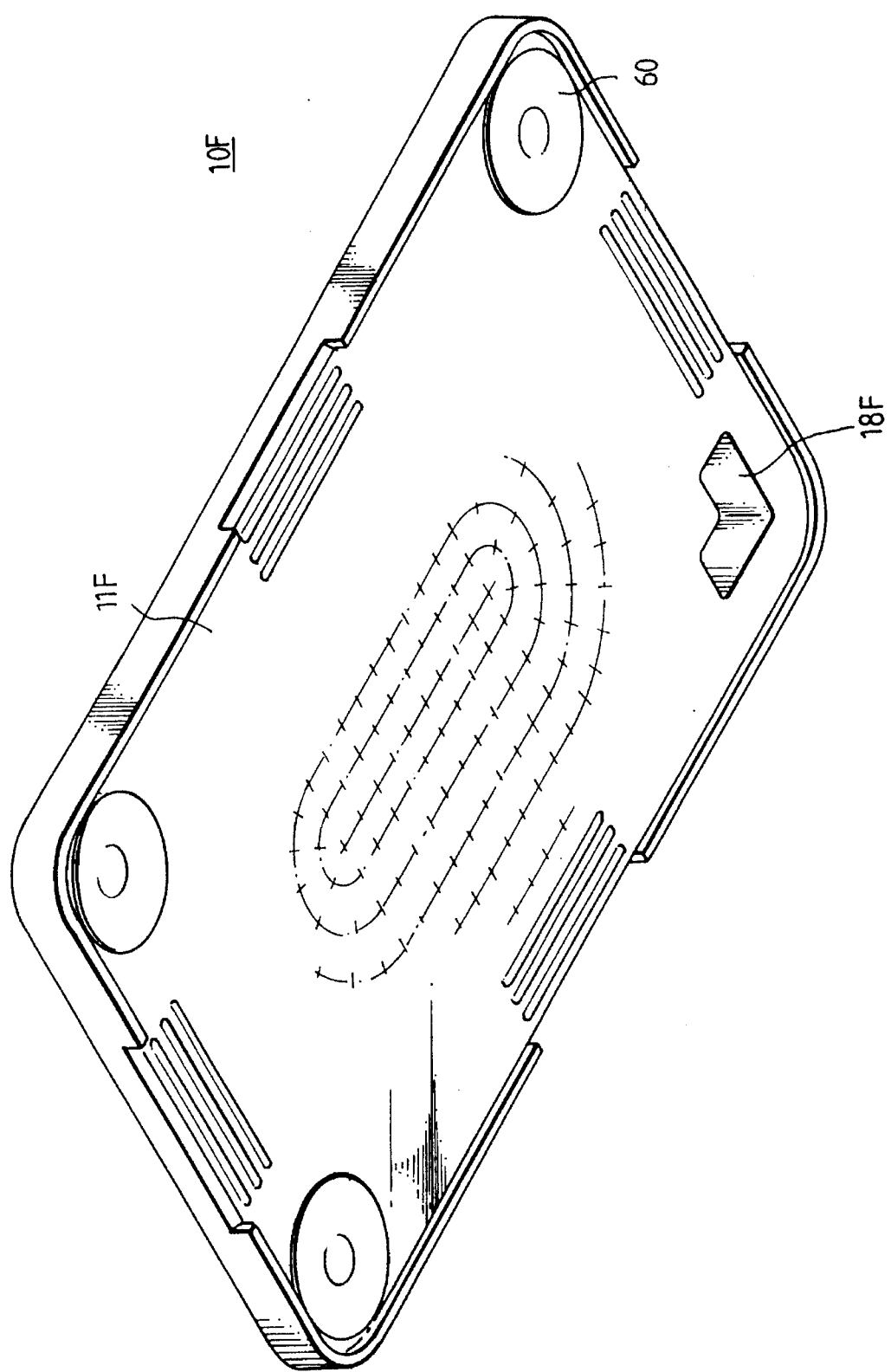
FIG. 16 is a perspective view showing the bottom of a seventh embodiment of the invention.

Referring to FIG. 16, the lower surface of the body 11F has a through hole 18F at a corner and the remaining three corners each have a suction disc 60 to strengthen the anti-slip ability of said pad 10F.

I claim:

1. A pad for supporting a culinary chopping board comprising a substantially planar body member including an upper surface and a lower surface, a peripheral wall extending circumferentially around a peripheral edge of the upper surface and upwardly therefrom, abutment means on the upper surface and spaced inwardly from the wall, a plurality of discrete convex areas on the upper surface, a plurality of discrete concave areas in the lower surface, the convex and concave areas corresponding to each other in position and configuration, and whereby the convex areas and abutment means function to respectively support and laterally restrain a chopping board on the pad during the chopping of food on the board.

2. The pad of claim 1 wherein each convex area includes at least one projection extending upwardly therefrom for engaging the lower surface of the chopping board.

3. The pad of claim 2 wherein the projections are deformable.

4. The pad of claim 1, wherein the lower surface of the body member includes a plurality of discrete concave areas corresponding in position and configuration to the convex areas, a plurality of intermediate areas disposed between the concave areas, and a plurality of projections extending downwardly from the intermediate areas for engaging a work surface.

5. The pad of claim 1 wherein at least the body member is formed from a soft plastic material.

6. The pad of claim 1 wherein the discrete convex and concave areas are of a corresponding elongate configuration and define ridges on the upper surface and channels on the lower surface of the body member.

7. The pad of claim 1 wherein substantially the entire pad is formed from soft ethylene plastic material, the abutment means includes a plurality of spaced plates extending upwardly from the upper surface of the body member, a hole formed through the body member and a ring extending around the perimeter of the hole and upwardly from the upper surface.

8. The pad of claim 1 wherein the discrete convex and concave areas are each of an arcuate configuration and spaced at intervals from a center of the body member.

9. The pad of claim 1 wherein the abutment means includes a plurality of fins extending inwardly from an inner surface of the wall.

10. The pad of claim 1 wherein the abutment means includes at least one secondary wall extending upwardly from the upper surface and spaced inwardly from and disposed parallel to the wall, the secondary wall including a bottom portion provided with a plurality of spaced open areas.

11. The pad of claim 1 wherein the abutment means includes a plurality of convex blocks extending inwardly from and spaced along an inner surface of the wall.

12. The pad of claim 1 wherein each convex area is of a semi-spherical configuration.

13. The pad of claim 1 wherein the lower surface of the body member includes a plurality of suction discs.

* * * * *